United States Patent [19]

Ong

[11] 3,740,460

[45] June 19, 1973

[54] AUTOMATIC CONTROL CIRCUIT FOR TELEVISION SOUND CARRIER

[75] Inventor: Kian Kie Ong, Emmasingel, Eindhoven, Netherlands

[73] Assignee: U.S. Philips Corporation, New York, N.Y.

[22] Filed: Aug. 24, 1971

[21] Appl. No.: 174,355

[30] Foreign Application Priority Data

Aug. 29, 1970 Netherlands ....................... 7012829

[52] U.S. Cl. ............................................... 178/5.8 A
[51] Int. Cl. ............................................... H04n 5/60
[58] Field of Search ....................... 178/5.8 R, 5.8 A

[56] References Cited

UNITED STATES PATENTS 2,880,269 3/1959 Dome ............................. 178/5.8 A

*Primary Examiner*—Robert L. Richardson
*Attorney*—Frank R. Trifari

[57] ABSTRACT

An automatic sound carrier suppression filter tuning circuit active on a detected intercarrier signal, which circuit includes an edge steepness detector after a limited circuit for the purpose of detecting the intercarrier signal.

8 Claims, 1 Drawing Figure

PATENTED JUN 19 1973
3,740,460
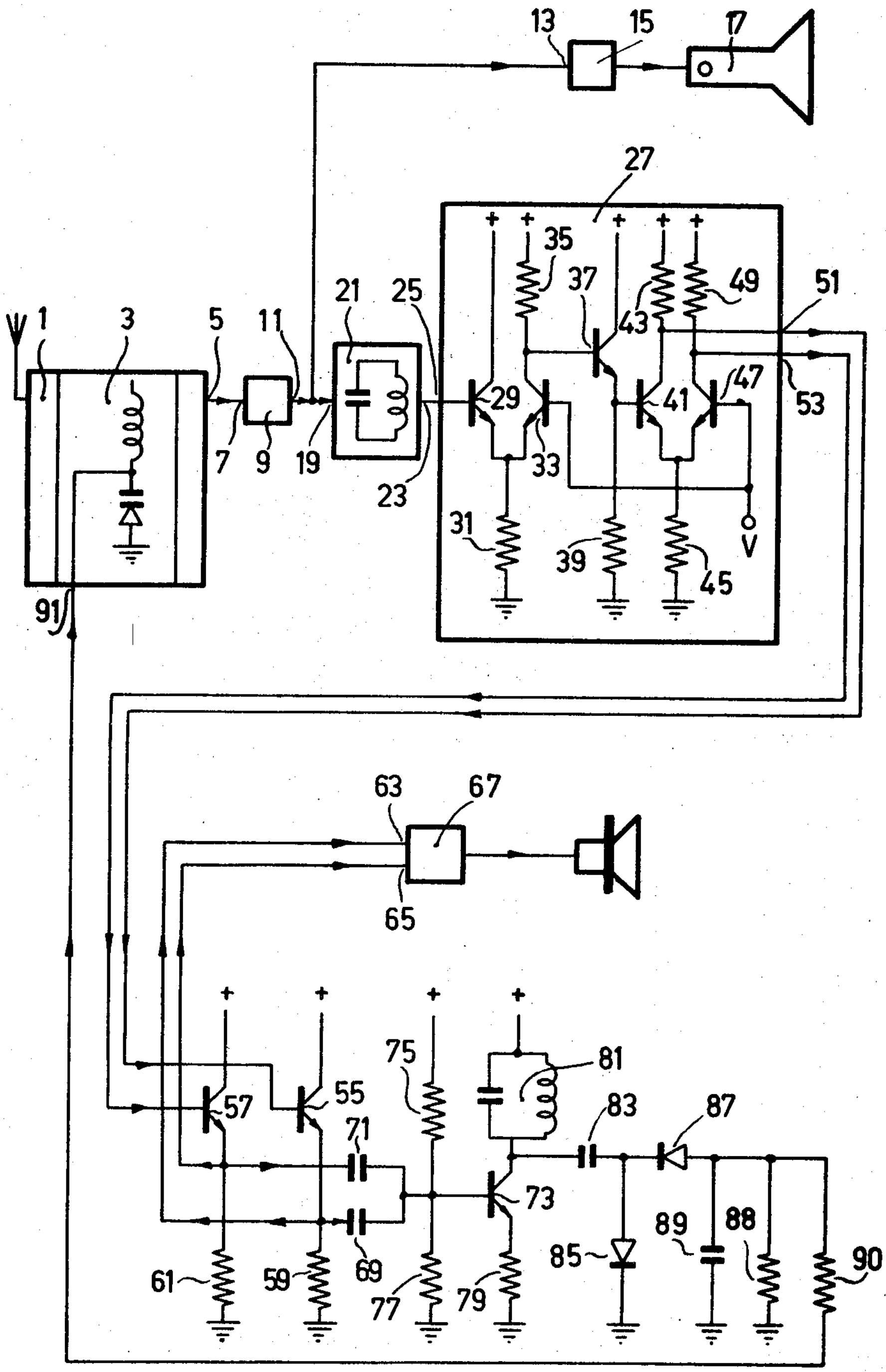
INVENTOR.
KIAN K. ONG
BY
AGENT

AUTOMATIC CONTROL CIRCUIT FOR TELEVISION SOUND CARRIER

The invention relates to a television receiver including a control circuit for controlling the extent of sound carrier suppression and comprising a sound carrier filter controllable by a control voltage and incorporated in a section of the receiver which is common for sound and picture carriers, an intercarrier detector coupled to an output of the common section, a limiter circuit coupled to an output of the intercarrier detector, and a control signal detection circuit coupled to an output of the limiter circuit, an output of said control signal detection circuit being coupled to a control signal input of the sound carrier filter.

It is known from German Pat. Specification 905377 that a sound carrier amplitude control circuit in a television receiver may have a structure as that described in the preamble. Such a structure may be very much desirable for given embodiments of present-day television receivers. A drawback is, however, that in case of reception of normal signals the limiter circuit must operate so as to remove interfering amplitude modulation from the frequency-modulated intercarrier sound signal obtained from the intercarrier detector. When the limiter circuit limits, amplitude variations of the intercarrier signal will, however, be greatly reduced and the control circuit, which employs the output signal from the limiter circuit, cannot work very effectively.

The object of the present invention is to obviate this drawback.

To this end a television receiver of the kind described in the preamble according to the invention is characterized in that the limiter circuit is a circuit passing on a part of the edges of its input signal, while the control signal detection circuit is an edge steepness detection circuit the output voltage of which is a function of the edge steepness of its input signal.

To ensure that the amplitude-dependent edge steepness of the input signal from the limiter circuit is reserved in a part of the output signal from this limiter circuit, it must be avoided that filters occur between or after the stages of such a circuit, which filters suppress all higher harmonics of the intercarrier signal. A limiter circuit will preferably have to be used with resistive couplings between the different stages. When using integrated limiter circuits, this condition is generally satisfied.

To detect the edge steepness of the output signal from the limiter circuit, it may be converted, for example, firstly into an edge steepness-dependent amplitude or waveform, for example, with the aid of a differentiating network or a low suppression or higher harmonic filter, whereafter an amplitude or pulse surface detector may be used to obtain the desired control voltage.

In order that the invention may be readily carried into effect, it will now be described in detail by way of example with reference to the accompanying diagrammatic drawing, which comprises a single FIGURE only.

The drawing shows the diagram of a television receiver according to the invention in which details which are not important for the understanding of the invention have been omitted as much as possible.

The receiver has an RF section and an IF section 1 in which a sound carrier filter 3 tuned to the sound carrier of the frequency occurring locally is incorporated for the suppression of this sound carrier.

An output 5 of the section 1 is connected to an input 7 of a detector 9. An output 11 of the detector 9 is connected to an input 13 of a video signal handling circuit 15 which is coupled to a picture display tube 17.

Furthermore, the output 11 is connected to an input 19 of a pass filter 21 tuned to the difference frequency (intercarrier frequency) of the picture and sound carriers. When a television signal is received, an intercarrier signal is supplied to an output 23 of filter 21 and is applied to an output 25 of a limiter circuit 27.

The limiter circuit 27 includes a first npn-transistor 29 whose base is connected to the input 25 of the limiter circuit, the collector being connected to a positive voltage supply and the emitter being connected to earth through a resistor 31, and the emitter being furthermore connected to the emitter of a second npn-transistor 33.

The base of the second transistor 33 is connected to a bias voltage V, while the collector is connected through a resistor 35 to a positive voltage supply and is furthermore connected to the base of a third npn-transistor 37 arranged as an emitter follower.

The collector of the third npn-transistor 37 is connected to a positive voltage supply and the emitter is connected to earth *via* a resistor 39. Furthermore, the emitter is connected to the base of a fourth npn-transistor 41 whose collector is connected to a positive voltage supply through a resistor 43, and whose emitter is connected to earth through a resistor 45. Furthermore, the emitter is connected to the emitter of a fifth npn-transistor 47 whose base is connected to the bias voltage V and whose collector is connected through a resistor 49 to a positive supply voltage.

The collectors of the fourth and fifth transistors 41 and 47 are each connected to outputs 51 and 53, respectively, of the limiter circuit 27. The outputs 51 and 53 are each connected to the bases of npn-transistors 55 and 57, respectively, arranged as emitter followers. The collectors of the emitter followers 55 and 57 are connected to a positive voltage supply and the emitters are connected to earth through resistors 59 and 61, respectively.

The emitters of the emitter followers 55, 57 are also connected to inputs 63 and 65, respectively, of a sound section 67 of the receiver and to two capacitors 69 and 71, respectively. The other ends of the capacitors 69 and 71 are interconnected and are connected to the base of an npn-transistor 73 and to a tap on a potential divider. The potential divider is constituted by a series arrangement of a resistor 75 and a resistor 77 between the positive voltage supply and earth. The potential divider 75, 77 constitutes, together with the capacitors 69 and 71, a differentiating network.

The emitter of transistor 73 is connected to earth through a resistor 79 and the collector is connected to a positive voltage supply through a parallel circuit 81 tuned to the double intercarrier frequency.

The collector of transistor 73 is furthermore connected to a connection of a capacitor 83 whose other connection is connected to the anode of a diode 85 and the cathode of a diode 87. The cathode of the diode 85 is directly connected to earth and the anode of the diode 87 is connected to earth through a parallel arrangement of a resistor 88 and a capacitor 89. The combination of the diodes 85 and 87, the capacitors 83 and 89 and the resistor 88 constitutes an amplitude detection circuit.

The anode of the diode 87 of this amplitude detection circuit constitutes a control signal output. This output is connected through a resistor 90 to a control signal input 91 of the sound carrier filter 3 whose tuning may be influenced by the voltage at the control signal input 91.

The operation of the circuit arrangement in so far as it is important for the understanding of the invention will now be further described.

An intercarrier signal originating from the detector 9 is deprived of frequencies beyond the desired intercarrier frequencies by the filter 21 and is applied in a substantially sinusoidal form to the limiter 27. Limiter 27 removes the peaks from the sinusoidal input voltage and applies truncated sinusoidal voltages in phase opposition to the outputs 51 and 53.

These truncated sinusoidal voltages include information regarding the amplitude of the original sine amplitude at the input of limiter 27 as a steepness of the edges of the output signals between the truncated portions. The edge steepness information of the truncated sinusoidal voltages is converted into amplitude information with the aid of the differentiating network 69, 71, 75, 77. This is evident as follows:

Each emitter follower 55, 57 applies a truncated sinusoidal voltage to its emitter. The positive going edges thereof are passed on in a differentiated manner through the relevant capacitor 69 or 71 of the differentiating network to the base of transistor 73 in which only the capacitance of the relevant capacitor and the equivalent resistance is active as a differentiation time constant at the junction of potential divider 75, 77 because the controlling emitter follower continues to conduct during the positive going edges. In case of the negative going edges the emitter follower 55 or 57 will be cut off and the relevant capacitor 69 or 71 will be discharged through resistor 59 or 61 in series with the said equivalent resistance of the potential divider so that only a part of these negative going edges is produced in a differentiated form at the junction of the potential divider.

The resultant output signal from the differentiating networks will therefore consist of a series of positive going pulses whose amplitude depends on the edge steepness of that of the output signal from the limiter 27 and hence on the amplitude of the input signal therefrom.

The positive pulses, which occur at a frequency, equal to the double intercarrier frequency, are amplified through transistor 73 and are converted in the collector circuit thereof with the aid of the filter 81 into a substantially sinusoidal voltage of double the intercarrier frequency. This voltage is again converted by the voltage doubling amplitude detection circuit 83, 85, 87, 88, 89 into a direct voltage which controls the tuning of the sound carrier filter 3 every time in such a manner that the amplitude of the sound carrier signal at the detector 9 maintains substantially the same value. As a result a certain extent of sound carrier suppression is ensured independent of, for example, the tuning of the receiver.

An advantage of the conversion into the double carrier frequency of the output signal from the emitter followers is the smaller risk of generating which might occur as a result of parasitic couplings.

In the given embodiment the limiter circuit 27 is formed with two stages. It will be evident that the number of stages thereof is not important for the essence of the invention.

Furthermore, the limiter circuit 27 has a finite frequency characteristic so that the edge steepness of its output signal will not be able to exceed a given maximum value. As a result the output voltage from the detection circuit 83, 85, 87, 89 will not be able to exceed a given maximum value. This makes the use of a control signal limiter superfluous.

An advantage of the use of a limiter circuit before the control voltage detector is that the circuit is less sensitive to noise, so that an unwanted detuning of the sound carrier filter in the case of reception of signals having a poor signal-to-noise ratio no longer occurs. The circuit may even be rendered less sensitive to noise by applying a threshold voltage to the diode 85.

What is claimed is:

1. A television receiver including a control circuit for controlling the extent of sound carrier suppression and comprising a sound carrier filter controllable by a control voltage and incorporated in a section of the receiver which is common for sound and picture carriers, an intercarrier detector coupled to an output of the common section, a limiter circuit coupled to an output of the intercarrier detector, and a control signal detection circuit coupled to an output of the limiter circuit, an output of said control signal detection circuit being coupled to a control signal input of the sound carrier filter, said limiter circuit comprising a circuit means for passing on a part of the edges of its input signal, and said control signal detection circuit comprises an edge steepness detection circuit having an output voltage that is a function of the edge steepness of its input signal.

2. A television receiver as claimed in claim 1, in which the limiter circuit comprises a balanced emitter follower output, each half of the balanced emitter follower output being connected to a differentiating network, an amplitude detector being coupled to an output of said differentiating network, an output of said amplitude detector being coupled to the control signal input of the sound carrier filter.

3. A television receiver as claimed in claim 2, further comprising at least a bandpass filter circuit for suppressing frequencies other than the second harmonic of the intercarrier frequency coupled between the differentiating network and the amplitude detector.

4. A circuit comprising an input means for receiving a composite signal having first and second component signals, means coupled to said input means for at least partially suppressing the amplitude of said first signal and having a control input, and an output means for providing said second signal and said at least partially suppressed first signal; means coupled to said output means for detecting both of said component signals; means coupled to said detecting means for limiting the amplitudes of and for passing through the edges of said component signals; and edge steepness detection means coupled to said limiting and passing means for applying a control signal that is a function of the steepness of said edges to said control input; whereby said amplitude of said first signal is limited.

5. A circuit as claimed in claim 4 wherein said limiting means comprises a balanced emitter follower output circuit having two halves, and further comprising a differentiating network coupled to each of said halves, and wherein said applying means comprises an amplitude detector coupled between said amplitude detector and said control input.

6. A circuit as claimed in claim 4 further comprising a filter tuned to twice the frequency difference between said first and second signals and coupled between said differentiating network and said amplitude detector.

7. A circuit as claimed in claim 4 further comprising a filter tuned to the frequency difference between said first and second signals and coupled between said detecting means and said limiting means.

8. A circuit as claimed by claim 4 wherein said suppressing means comprises a filter tuned to the frequency of said first signal.

* * * * *